US008938251B2

(12) United States Patent
Li et al.

(10) Patent No.: US 8,938,251 B2
(45) Date of Patent: Jan. 20, 2015

(54) APPARATUS AND METHOD FOR MERIT BASED COGNITIVE RADIO FREQUENCY RESOURCE ALLOCATION (75) Inventors: Lingjie Li, Ottawa (CA); Jung Yee, Ottawa (CA)

(73) Assignee: Wilan Canada Inc., Ottawa (CA)

( * ) Notice: Subject to any disclaimer, the term of this patent is extended or adjusted under 35 U.S.C. 154(b) by 79 days.

(21) Appl. No.: 13/540,292

(22) Filed: Jul. 2, 2012
(Under 37 CFR 1.47)

(65) Prior Publication Data
US 2014/0004872 A1 Jan. 2, 2014

(51) Int. Cl.
*H04W 72/00* (2009.01)
*H04W 16/14* (2009.01)
(52) U.S. Cl.
CPC ..................................... *H04W 16/14* (2013.01)
USPC .......................... 455/454; 455/422.1; 455/450
(58) Field of Classification Search
CPC ..... H04W 72/04; H04W 16/14; H04W 24/10; H04W 24/02; H04W 84/045; H04W 28/16; H04W 72/0426; H04W 72/005
USPC ............... 370/252, 328, 343; 455/422.1, 450, 455/452.2, 454, 455, 516
See application file for complete search history.

(56) References Cited

U.S. PATENT DOCUMENTS

2006/0025127 A1* 2/2006 Cromer et al. ............. 455/432.1
2010/0081449 A1* 4/2010 Chaudhri et al. .......... 455/452.2
2010/0182928 A1* 7/2010 Wu et al. ....................... 370/252

* cited by examiner

*Primary Examiner* — Dinh P Nguyen
(74) *Attorney, Agent, or Firm* — CRGO Law; Donna A. Flores (57) ABSTRACT A frequency resource allocation system and method for a wireless network that comprises one or more unlicensed cognitive devices that operate using white spaces in a TV frequency spectrum and one or more licensed incumbent devices that are associated with an incumbent service that uses the TV frequency spectrum stores one or more frequency resource databases that store one or more frequency band lists. A frequency band list comprises one or more frequency bands within the TV frequency spectrum. Merit-related information specific to a location associated with the wireless network are collected to choose a specified frequency based on the merit-related information. The specified frequency band can be chosen based on a merit class derived from transforming the merit-related information into different merit classes, with each merit class being associated with one or more frequency bands. A resource user device is then notified to operate in the specified frequency band.

10 Claims, 8 Drawing Sheets

APPARATUS AND METHOD FOR MERIT BASED COGNITIVE RADIO FREQUENCY RESOURCE ALLOCATION

FIELD OF THE INVENTION

This invention relates to wireless networks, and, in particular, to a method and system for enhancing radio frequency resource allocation.

BACKGROUND

The Advanced Television Systems Committee (ATSC) has developed a standard for broadcast of digital television in the United States over defined TV frequency bands. Among other countries, the ATSC standard has been adopted in Canada, Mexico, and is under consideration in even more countries. The evolution of TV broadcasting from analog to digital, however, has led to the opening of some TV channels in the TV frequency bands known as "TV white spaces" (TVWS) to unlicensed operation of secondary devices, also known as white space devices (WSD), that operate within what is known as cognitive radio (CR) systems provided that such devices avoid interference with licensed (incumbent) services such as digital TV and wireless microphones.

Devices or equipment operating in the TV frequency bands must follow Federal Communications Commission's (FCC) regulations, which requires that the quality of the primary service should not be degraded by the operation of the WSDs.

The terms "secondary devices" or "cognitive radios" are used herein interchangeably to designate devices operated by un-licensed users. Similarly, the terms "primary services" and "incumbent services" is used herein interchangeably to designate services operated by licensed users, while "primary devices or "incumbent devices" are used to designate devices that operated with "primary services" and "incumbent services." The term "free channel" or "white space channel" is used here to designate a TV channel that is not currently in use by a primary service or incumbent device. The term "wireless devices" or "devices" is used to designate a variety of devices including, and not limited to mobile telephones, portable computers, stationary computers, portable handsets, etc.

The FCC rules further require that manufacturers of WSDs or secondary devices to contact an authorized database system to obtain a list of channels that are authorized for operation (i.e., channels not protected for incumbent services). So far, FCC has authorized a number of TV White Space Database Administrators (TVWSDA) to provide TVWS database service to WSDs. One such TVWSDA is Telcordia Technologies, which is a member of the TV White Space Database Group that implemented a specification for database-to-database (DB-DB) interface with TV white space (TVWS) databases authorized by the FCC.

Channel use authorizations are determined for a specific location. In an authorized system, the operating white space devices are required to provide their geographic location by means of a secure Internet connection to a TVWS database. The TVWS database will return a list of authorized channels available for operation by the WSDs for their reported locations. A web portal is used to register protected primary devices and services entitled to protection as authorized by the FCC rules. These devices and services include: low power auxiliary stations, including wireless microphones, Multi-Channel Video Programming Distributor (MVPD) receive sites and Broadcast Auxiliary links (cable headend receive sites).

A TVWS database includes data associated with registered "protected entities" including user IDs, Owner/Registrant and Contact information. MVPD receive sites, wireless microphone users, and operators of temporary BAS links must specifically register their sites with an authorized TVWSDA to receive protection from white space devices. The database services provides a registration site to register for protection from white space device interference on a channel or channels as permitted by the FCC rules at a geographic location.

Some TVWSDAs offer channel availability calculator/contour visualization tools to see the channels available for white space devices at a geographic location or to view protected contours on a map or view the details of protected entities. The TVWSDAs compute "protected contours" for licensed services including TV and wireless microphone services using propagation models. They also record other "keep out" areas such as border regions of U.S. with Canada and Mexico. These protected contours and keep out areas are based on FCC regulations which aim to protect licensed services. A TVWS database allows a WSD to use a channel if the WSD is outside these protected contours and keep out areas.

Therefore, WSDs need to be equipped with spectrum usage and management capabilities in order to meet the FCCs requirements. As such, WSDs are required to identify free, or unused, channels in the TV bands, and/or identify channels that are occupied by incumbent services. If a incumbent service is identified, the secondary user is required to seek other channel(s) or delay its use of the channel(s) until the incumbent ceases to use the channel(s).

In a CR system within which WSDs operate, frequency resource allocation determines channels or frequency bands for the CR system to use. The frequency resources are provided by a frequency resource provider, for example a TVWSDA, in a specific locality. The frequency resource is allocated by a frequency band allocator, and is then used by resource users. An existing frequency resource allocation scheme includes a TVWS database, which provides a list of TV channels available for the CR system to use. A resource allocator decides which channel(s) to use, and notifies the resource user. The resource user uses the channel(s) to operate.

This approach has a number of drawbacks. One drawback is that the propagation model used to compute protected contours may not be accurate, resulting in over-protection of incumbent services and prohibiting WSDs from operating at locations where such devices can operate without interfering incumbent services. These locations may include deeply shadowed areas inside protected contours and indoor areas where building attenuation protects outdoor incumbent services from interference from indoor CR operation. Another drawback is that the propagation model may not be able to catch non-stationary changes over time. These changes may result from weather and traffic. Moreover, some transmitters using the frequency resource may not be recorded in the database. For example, a TVWS database only has records on registered licensed services. All unregistered incumbents are not taken into consideration in the database.

These drawbacks prevent a database to provide reliable quality measures on frequency resources. Here, the quality of a frequency band is measured by the interference the CR system may generate to incumbent services and the interference level and types the CR system may suffer from other users.

Accordingly, there exists a need to prevent interference to incumbent services, while optimizing frequency resource utilization to improve CR system performance and achieve better coexistence among CR systems.

SUMMARY

Briefly, according to the present invention, a frequency resource allocation system and method determines which channel(s) to use for a wireless network. The wireless network comprises one or more unlicensed cognitive devices that operate using TV white space channels. There may be one or more licensed incumbent devices that are associated with an incumbent service. These incumbent devices use TV channels on a licensed basis, and their information is stored in one or more frequency resource databases.

In general, a channel list comprises channels within the TV spectrum bands that are available for un-protected use. Merit-related information specific to a location associated with the wireless network are collected to choose channel(s) for use by secondary devices. Merit-related information is a combination of merits of different classes. A merit class can be associated with one or more channels and one or more transmitted signal types. A quality measure can be associated with a channel by combining merit-related information. A higher quality measure associated with a channel, compared with a lower quality measure for another channel, generally indicates that an unlicensed cognitive device operating in such a channel generates less interference to incumbent services, and suffers less interference from other services. After a high quality channel or channels are chosen by the frequency resource allocation system, frequency resource user devices operating within the TV frequency bands are then notified to operate in the specified channel.

In order to determine the quality measure, a fusion method could be applied. Examples of such method are Dynamic Classifier Selection (DSC), Classifier Structuring and Grouping (CSG) and Hierarchical Mixture of Experts (HME) method. According to other more detailed features of the present invention, a soft merit value can be associated with a merit class within an upper bound and a lower bound. Moreover, the merit values can be associated with corresponding weighting factors. Weighted merit values corresponding to the different the merit classes can be added together to yield a quality measure.

DESCRIPTION OF THE INVENTION

As further described below, the present invention improves CR system performance by determining qualities of frequency bands using merit information that are specific to the characteristics of local frequency spectrums. In one embodiment, one or more spectrum sensors are used to detect signal types and power levels existing on frequency bands at specific locations, the sensing results are summaries in merit-related information. Another example is that the CR system is able to obtain transmitter location, frequency and schedule information from a neighboring CR system, and get a better assessment of actual usage of a frequency band. In order to optimize frequency resource utilization, quality measures on frequency bands or channels can be used for frequency resource allocation that prevents interference to incumbent services, optimizing CR system performance and achieving better coexistence among CR systems.

According to one aspect of the invention, a frequency resource allocation method uses merit related information providers to collect merit related information on frequency bands. A merit related information provider can be a TVWS database or independent of it. As herein defined, a TVWS database is a database certified by a cognizant regulatory to ensure proper allocation of available white space channels to avoid interference among incumbent services and white space devices. Merit-related information is then used to generate a merit-enhanced white space channel list. The list is then provided to one or more frequency resource allocators. The merits associated with white space channels are processed to find channels with best quality for a CR system to use.

Examples of the invention are described with reference to the proposed IEEE 802.22 standard for Wireless Regional Area Network (WRAN), which uses white spaces in the TV frequency band to allow for sharing geographically unused channels on a non-interfering basis. It should be noted that the embodiments described herein are not limited to such standard and could be used with other CR systems that use white spaces. The present invention can be implemented in processor-based wireless communication devices, including mobile wireless devices, base station, base transceiver stations, and access points that are intended for operation in a portion of the RF spectrum shared with licensed incumbent or primary services.

Figure 1:
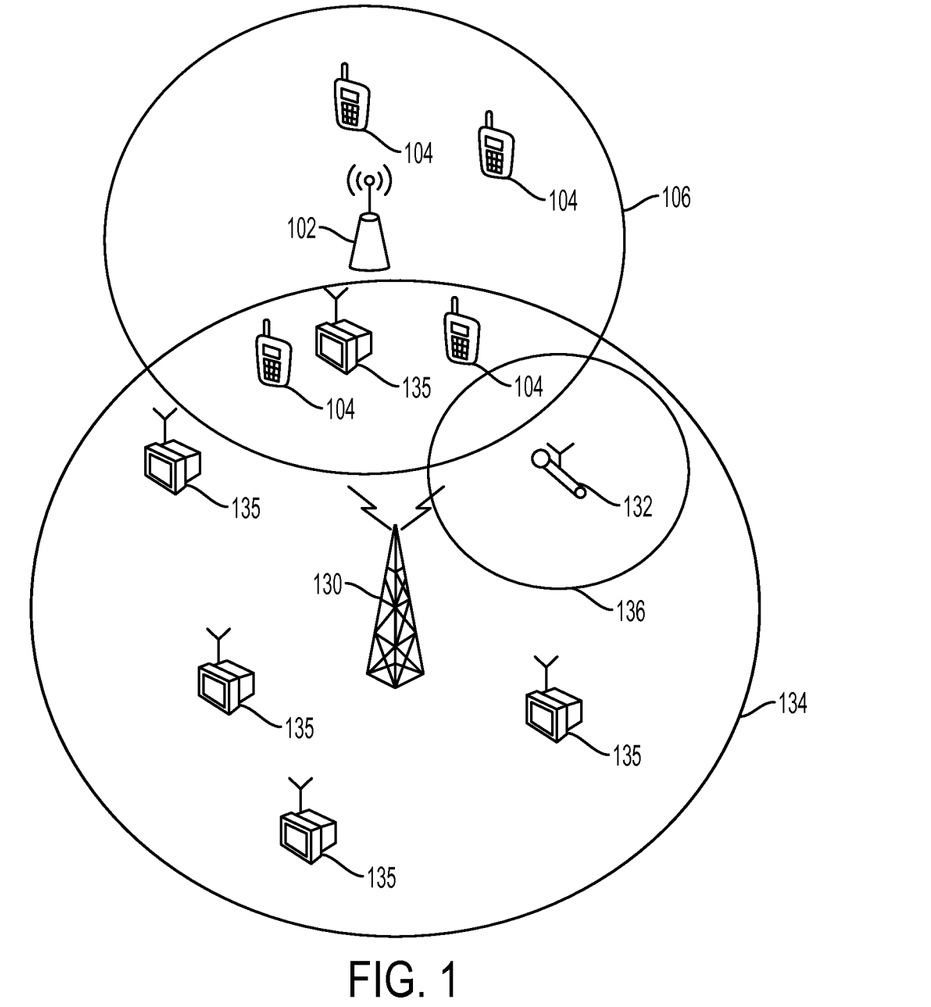
FIG. 1 is a block diagram of a wireless system that implements the present invention.

FIG. 1 shows an embodiment of a WRAN operating in an geographic area partly occupied by a primary service, such as a TV service. The WRAN includes at least one Base Transceiver Station (BTS), wireless access point or base station (BS) 102, and a plurality of secondary wireless devices 104 communicating with the BS 102.

Figure 2A:
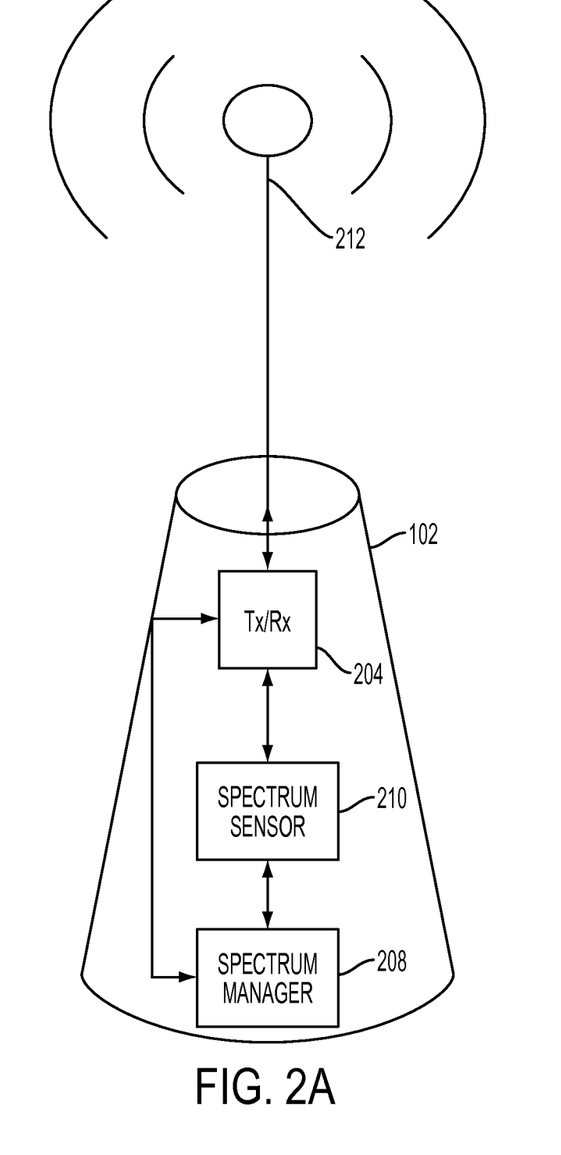
FIG. 2A is a block diagram of a base station used in the wireless system of FIG. 1.
Figure 2B:
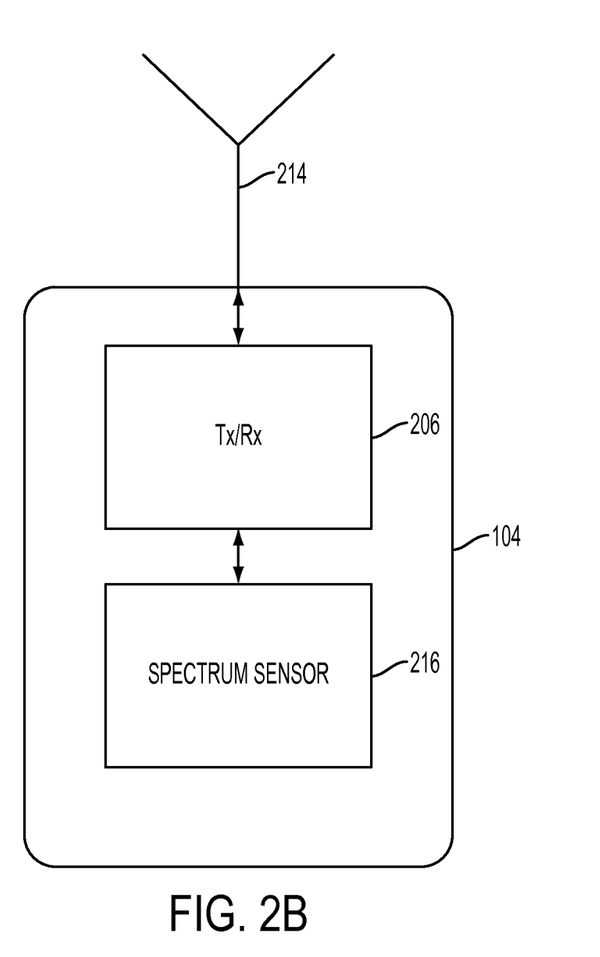
FIG. 2B is a block diagram of a secondary wireless device used in the wireless system of FIG. 1.

FIGS. 2A and 2B show that each of BS 102 and WSDs or secondary wireless devices 104 includes receiver and transmitter functions, such as implemented by transceivers 204 and 206. Similarly, secondary wireless devices 104 can be implemented as mobile stations, active terminals, mobile terminals, mobile transceivers, or other suitable wireless devices. The secondary wireless devices 104 can also be fixed devices, such as customer premise equipment (CPE) located at a customer premise. BS 102 serves a radio coverage area as indicated generally by the area 106. The BS 102 and secondary wireless devices 104 can, for example, transmit OFDM signals comprising subcarriers in a channel divided into sub-channels.

The WRAN, for example, is associated with one or more TVWS database, in an environment that includes primary services such as television service provided by TV tower 130, or a venue in which a wireless microphone 132 is operating. The TV tower 130 has a coverage area generally indicated by the area 134 and transmits to television sets 135 within the coverage area. The standard TV spectrum band provides 69

TV channels in the very high frequency (VHF) and ultra high frequency (UHF) bands. Each TV channel occupies 6 MHz of bandwidth. The wireless microphone 132 transmits within an area generally indicated by the area 136 and also transmits in the TV spectrum band, generally it may only be transmitting on a portion of a channel. The WRAN makes use of unused channels, or portions thereof, in the TV spectrum band. In this regard, the WRAN must perform "channel sensing" or "spectrum sensing" to determine which of the channels, or portions of channels, are available for use. The availability of channels for secondary devices 104 changes over time. The secondary devices 104 beneficially obtain channel availability in a dynamic manner Thus, as primary devices start and finish transmission on a certain channel, the channel becomes unavailable and available, respectively, for occupation by the secondary devices.

FIGS. 2A and 2B illustrate elements of the BS 102 and a secondary wireless device 104 used to perform the necessary spectrum sensing according to the present invention. In order to protect the primary devices and provide service to the secondary devices, a spectrum manager module 208 in the BS 102 is provided to dynamically assign free TV channels to secondary devices contending for service. The spectrum manager 208 collects information related to channel availability and information regarding the secondary devices 104. This information can be provided through TVWS databases (not shown) with which the BS 102 communicates, through dynamic reporting from the secondary wireless devices 104, and through dynamic sensing by the BS 102. A spectrum sensor module 210 in the BS 102 provides the spectrum sensing capabilities, and communicates with the spectrum manager 208. Spectrum sensing and communication with the secondary wireless devices 104 is performed in conjunction with the transceiver 204 and the antenna 212. Each secondary wireless device 104 is also provided with a physical interface, including a transceiver 206 and an antenna 214. A spectrum sensor module 216 communicates with transceiver 206 to perform spectrum sensing.

As will be appreciated, the BS 102 and each secondary wireless device 104 is a processor-based device with one, or more, processors and associated memory. In this context, computer programs, or software, are stored in memory for execution by the processor. The processors may be any suitable stored-program control processors, and the memory can be any suitable storage device (volatile and/or nonvolatile), such as random-access memory (RAM) or read-only memory (ROM), which can be internal and/or external to the BS 102 or secondary wireless device 104, and can be as necessary. Embodiments of the method and other programmable components can be represented as a software product stored in the memory (also referred to as a computer-readable medium, a processor-readable medium, or a computer usable medium having a computer-readable program code embodied therein). Software running from on the processor can interface with circuitry to perform the described tasks.

Figure 3A:
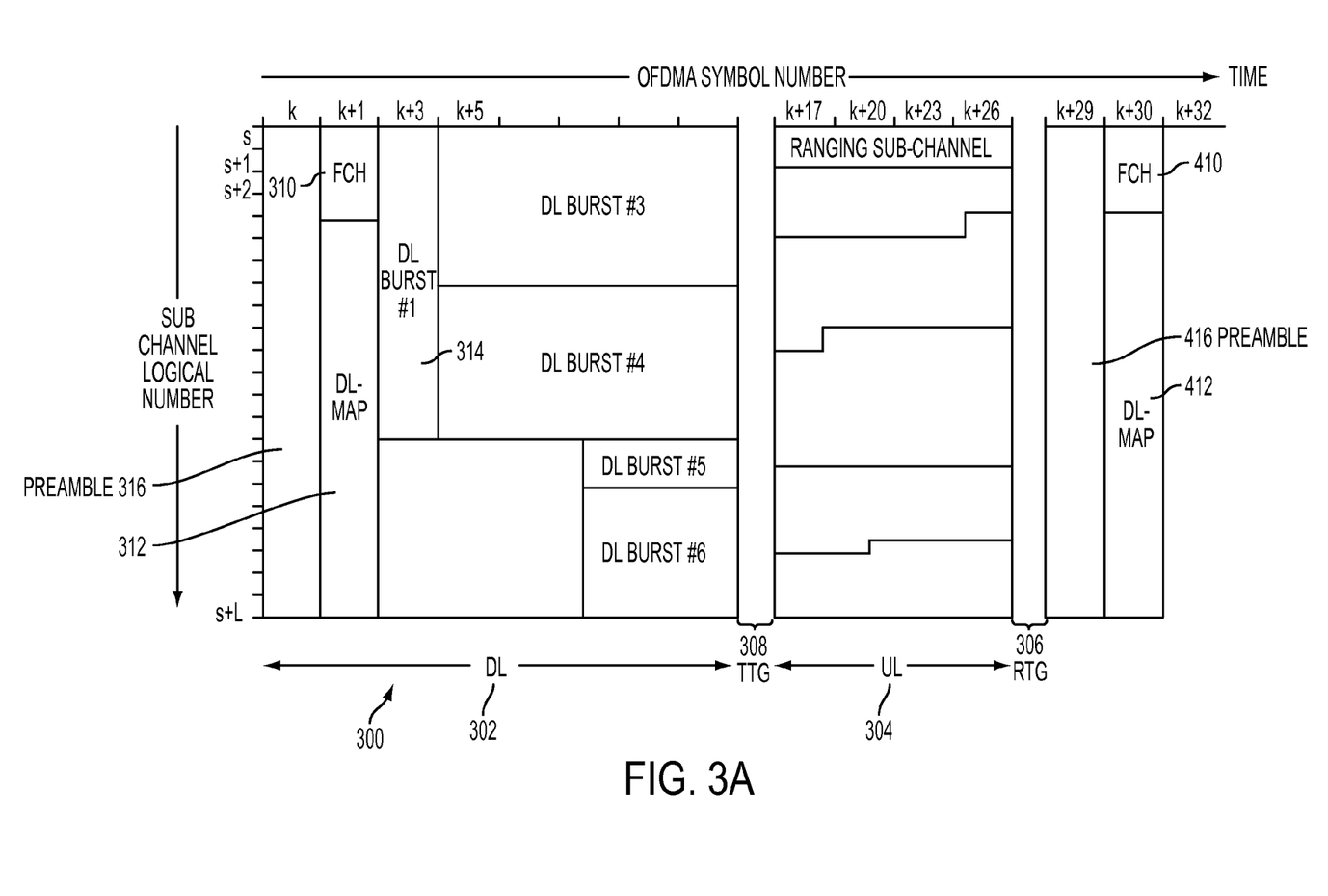
FIG. 3 is a diagram of an OFDMA frame used in the wireless system of FIG. 1.
Figure 3B:
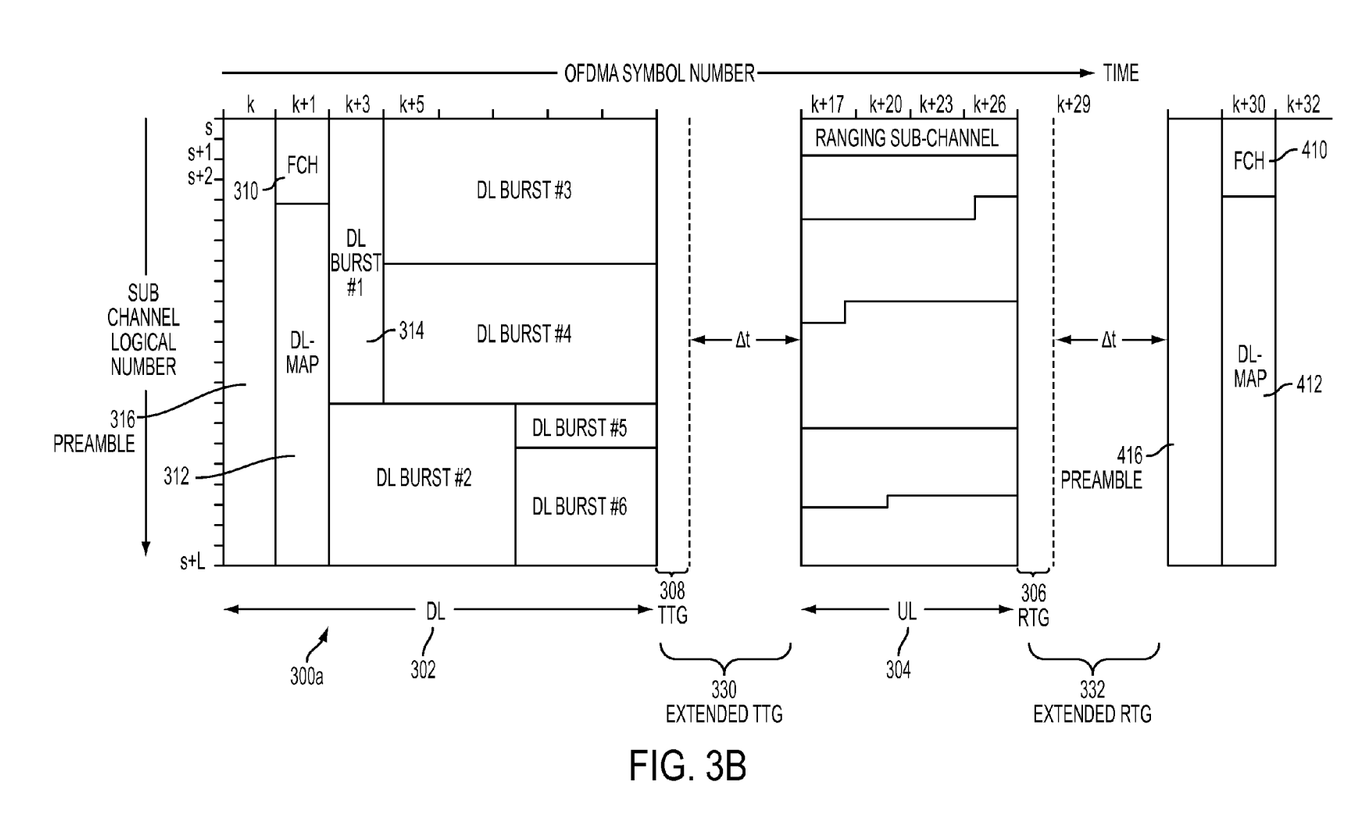

The physical layer of communication between BS 102 and secondary wireless device 104, via antennas 212 and 214, is for the purposes of illustration OFDM-based. An illustrative frame 300 for use in communicating information between BS 102 and secondary wireless device 104 is shown in FIG. 3. Frame 300 is similar to an OFDMA representative of a time division duplex (TDD) system in which the same frequency band is used for uplink (UL) and downlink (DL) transmission. As used herein, uplink refers to communications from secondary wireless device 104 to BS 102, while downlink refers to communications from BS 102 to secondary wireless device 104. Each frame comprises two subframes, a DL subframe 302 and a UL subframe 304. In each frame, time intervals are included to enable BS 102 to switch from receive to transmit mode and vice-versa. During this intervals, the BS 102 is not transmitting modulated data but is simply allowing the BS transmitter carrier to ramp up, and the transmit/receive (Tx/Rx) antenna switch to actuate. The intervals are shown in FIG. 3 as an RTG (receive/transmit transition gap) interval 306 and a TTG (transmit/receive transition gap) interval 308. Each subframe conveys data in a number of bursts.

Information about the frame and the number of DL bursts in the DL subframe and the number of UL bursts in the UL subframe is conveyed in frame control header (FCH) 310, DL MAP 312 and UL MAP 314. Each frame also includes a preamble 316, which provides frame synchronization and equalization. The downlink preamble 316 is generally used in wireless systems for physical-layer functionality, such as time and frequency synchronization and initial channel estimation. The preamble has one of 128 patterns and the neighboring cells have different preambles so that the terminals can to distinguish the cells and sectors from others.

To enter a WRAN network, secondary wireless device 104 first attempts to associate with BS 102. During this attempt, secondary wireless device 104 transmits information, via transceiver 206, on its capabilities to BS 102 via a control channel (not shown). The reported capabilities include, e.g., minimum and maximum transmission power, and a supported channel list for transmitting and receiving. In this regard, secondary wireless device 104 performs channel sensing, through its spectrum sensor 216, to determine which TV channels are currently available at its location. The resulting available channel list for use in WRAN communications is then provided to BS 102. The spectrum manager 208 of BS 102 uses the reported information to decide whether to allow secondary wireless device 104 to associate with it.

Figure 4A:
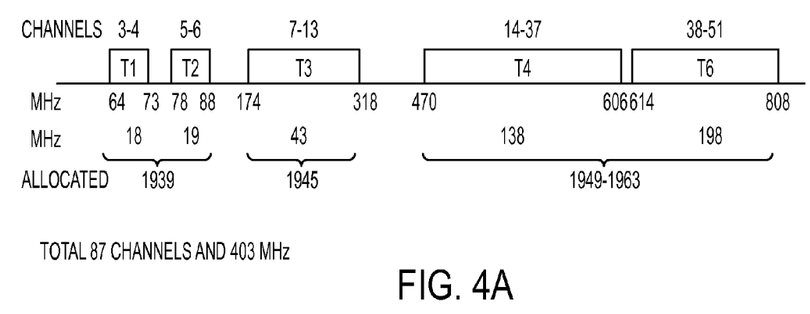
FIG. 4A shows a digital TV broadcast spectrum.
Figure 4B:
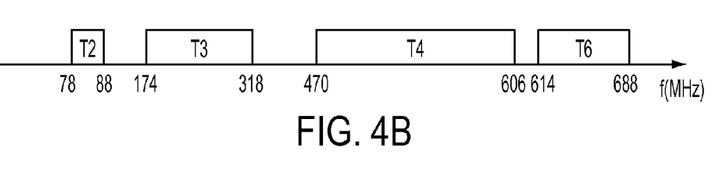
FIG. 4B illustrates four bands within the digital TV broadcast spectrum of FIG. 4A where white space spectrum may become available.

FIG. 4A illustrates a digital television broadcast spectrum showing five bands denoted with T1-T5. Band T1 is occupied by TV channels 2-4, Band T2 is occupied by channels 5-6, Band T3 occupied by channels 7-13, Band T4 is occupied by channels 14-36 and Band T5 is occupied by channels 38-51. Thus, this group of TV channels covers a total spectrum of 294 MHz, Since channels 2, 3, and 4 will be reserved for some specific applications, after this reservation, the commercial TV channels will encompass 274 MHz, ranging from 76 MHz to 698 MHz, as shown on FIG. 4B by bands T2-T5.

Figure 5:
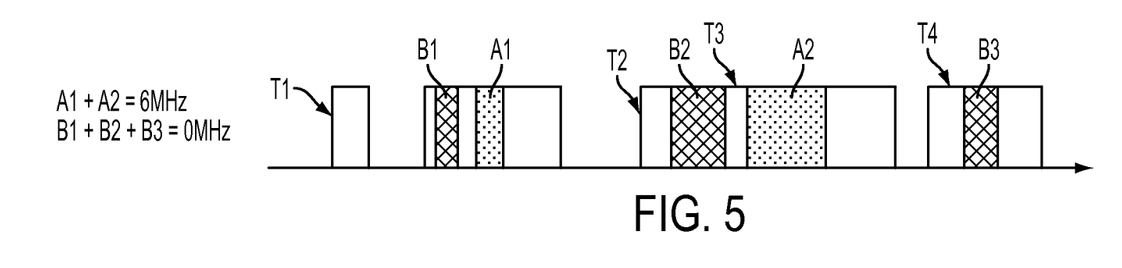
FIG. 5 is a diagram of white space allocation per frequency resource user devices.

FIG. 5 shows examples of white space allocations per user. For example, in order to a allocate a 6 MHz channel to a user A, a spectrum sensor module scans the spectrum and identifies a 2 MHz piece of white space in T2, denoted with A1 and another piece of 4 MHz white space in T3, denoted with A2. As another example, if 1 MHz is available in band T3, shown by B1, 3 MHz are available in T4 shown as B2, and 2 MHz are available in T5 shown as B3, a user B will receive on a white space channel having 6 MHZ bandwidth including all three pieces of spectrum B1, B2 and B3.

Figure 6:
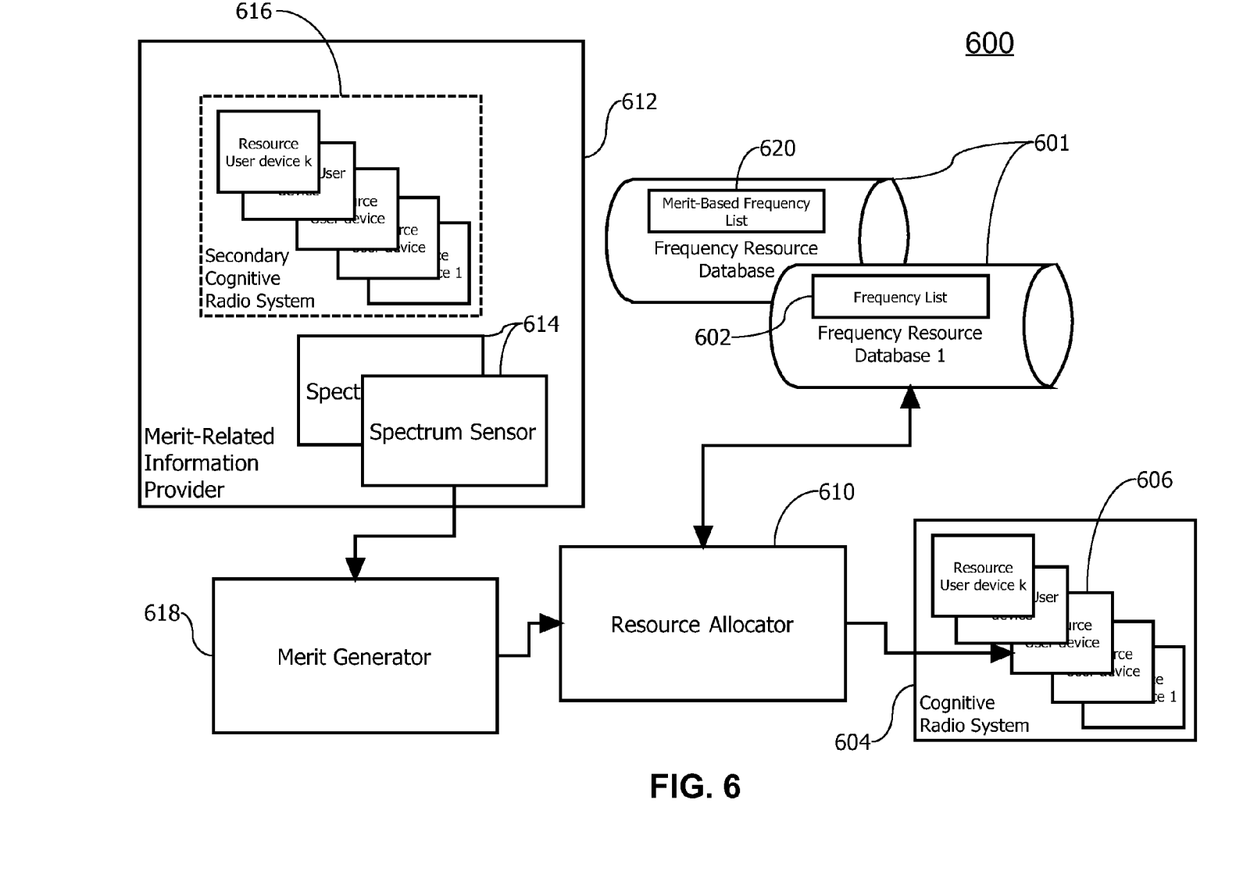
FIG. 6 is a block diagram of a radio frequency resource allocator used in the wireless system of FIG. 1.

FIG. 6 shows block diagram of a frequency resource allocation system 600 associated with WRAN of FIG. 1 according to one embodiment of the present invention. The frequency resource allocation system 600 comprises one or more frequency resource databases 601 that store one or more frequency band lists 602 containing available frequency bands for use by a CR system 604 comprising one or more resource user devices 606, for example, comprising one or more CRs. A resource allocator 610 notifies a resource user device to operate in specified frequency bands. A merit-related information provider 612 comprises one or more spectrum quality measure sensors 614 for merits of different merit classes, for example in terms of signal types and strengths. In one embodiment, the merit-related information provider 612 also includes a neighboring CR system 616 can also provide additional merit-related information in terms of its transmitter location, frequency band and transmission schedule. A merit generator 618 collects and processes merit-related information associated with the WRAN. A merit generator comprises one or more well-known processing units (not shown) that execute a merit generation software or method to process the merit related information and generate a merit-enhanced frequency resource list. The list is then sent to the resource allocator. The resource allocator summaries the merits into quality measure values, and chooses frequency bands with best quality measures. It then notifies the resource user device 606 to operate in the chosen frequency bands.

In one embodiment, a merit generation method executed in a processing unit is applied at the merit generator to transform the merit related information into merits of different classes, and associates such merits with frequency bands to generate a merit enhanced frequency band list 620 that is stored in a frequency resource database 601. Each merit class can be associated with one or more frequency bands and one or more signal types. In one embodiment, the merits can be transformed into quality measure and the resource allocator evaluates and compares the frequency bands in the merit enhanced frequency band list 620 using the quality measures. Frequency bands with the best quality are chosen for operation of the resource user 606.

A merit class may be associated with a type of signal. The merit of the class indicates the signal strength of the signal type in a frequency band. The merit class may also indicate the transmitter location of the signal type. Other information may also be included in the merit measure. For example, an indication as to whether the signal strength is from a sensor or a group of sensors or a database. Reliability measures may be part of the merit. For example, based on measured signal strength, an associated probability of false detection may be determined using any number of well-known probability techniques that may or may not rely on when the last detection was conducted.

Due to the different natures and locations of merit-related information providers, various types of methods may be applied to obtain merits on each merit class. For example, multiple spectrum sensors at different locations may provide different sensing results on the same signal type. Numerous methods can be used to combine the sensing results and make a conclusion on the signal strength at the resource user's location. For example a decision support system (DSS) can be used to create a model, which given a minimum amount of input data/information, is able to produce correct decisions using fusion methods. According to one approach, the progress of DSS is based on continuous development of existing methods as well as discovering new ones. As the limits of the existing individual method are reached, well performing methods on different data are combined to achieve better results. Such fusion of information reduces uncertainty and assuming that all individual methods perform well. The combination of such multiple methods reduces overall classification error and as a consequence emphasizes correct outputs. Information fusion techniques have been intensively investigated in recent years and their applicability for classification domains has been widely tested. Fusion of data/information can be carried out on various levels of abstraction connected with the flow of the classification process: data level fusion, feature level fusion, and classifier fusion.

As such, to determine the quality of a frequency band, merits of different classes can be combined to yield a single quality measure. A higher quality measure for a frequency band could indicate that a CR device operating on a band would generate less interference to incumbent services and suffers less interference from existing wireless signals to achieve good system performance A number of known fusion methods could operate on the classifiers rather than their outputs, trying to improve the classification rate by pushing classifiers into an optimized structure. These methods include Dynamic Classifier Selection (DSC) (also referred to as an alternative approach to the classifier fusion), Classifier Structuring and Grouping (CSG) and Hierarchical Mixture of Experts (HME).

A merit measure may have a lower bound. If the merit of a merit class reaches or is lower than the lower bound, then the band is not usable. A number of factors make such a situation to happen. For example, if the signal strength of an incumbent signal type is above the threshold set by local regulations, then the CR system cannot use this band. Another case is that the interference level in the band is above tolerance level of the CR system, and the CR system cannot reach its desired performance.

A merit measure may also have an upper bound. If the merit of a merit class reaches or is higher than the upper bound, then the change of the merit makes no difference to the quality measure. For example, if the signal strength of a signal type reaches or is lower than some threshold, then the CR system can achieve its best performance. Changing of the signal strength does not make any difference of the quality of the band. Between the lower and upper bound, a merit can be represented by a soft value derived from a soft-decision fusion method formulated for multiple-sensor distributed binary detection systems according to one or more well-known criteria. A fusion rule can be applied that combines reliability terms weighted by the corresponding confidence levels to derive a soft value final binary global decision.

For the combination of merit of different merit classes, weighting factors may be used. The merit value of a merit class is first weighted by the weighting factor associated with the merit class. Then, all weighted merit values are added together to yield a single quality measure. Frequency bands with the highest merit values are then chosen for the resource user to operate.

The merit generator 618 may be associated with a single CR system. It may also be independent of any CR system and serve multiple CR systems in a local area. It may also be a global merit generator serving all CR systems. The resource allocator 610 is generally associated with a CR system. It may also be independent of any CR system and serves multiple CR systems in a local area. It may also be a global resource allocator serving all CR systems.

The resource allocator 610 can be a hardware device, or a connected hardware device network. It may also be a software entity, or distributed software operating on connected devices. The merit based frequency resource allocation system and method of the present invention may be generalized to allocation of other resources which can be enhanced by merits.

Those of skill will appreciate that the various illustrative logical blocks, modules, and algorithm steps described in connection with the embodiments disclosed herein can often be implemented as electronic hardware, computer software, or combinations of both. To clearly illustrate this interchangeability of hardware and software, various illustrative blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), an application specific integrated circuit (ASIC), a field programmable gate array (FPGA) or other programmable hardware device, discrete gate or transistor logic, discrete hardware components, or any combination thereof designed to perform the functions described herein. A general-purpose processor can be a microprocessor, but in the alternative, the processor can be any other hardware processor, controller, or microcontroller. A processor can also be implemented as a combination of computing devices, for example, a combination of a DSP and a microprocessor, a plurality of microprocessors, one or more microprocessors in conjunction with a DSP core.

The steps of a method or algorithm and the functionality of a block or module described in connection with the embodiments disclosed herein can be embodied directly in hardware, in a software module executed by a processor, or in a combination of the two. A software module can reside in the computer or processor accessible or readable storage media including RAM memory, flash memory, ROM memory, EPROM memory, EEPROM memory, registers, hard disk, a removable disk, a CD-ROM, or other form of storage medium such as a computer readable storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

The invention claimed is:

1. A frequency resource allocation system for a wireless network that comprises one or more unlicensed cognitive devices that operate using white spaces in a TV frequency spectrum and one or more licensed incumbent devices that are associated with an incumbent service that uses the TV frequency spectrum, comprising:
   one or more resource user devices comprising the one or more unlicensed cognitive devices;
   one or more frequency resource databases that store one or more frequency band lists, each frequency band list comprising one or more frequency bands within the TV frequency spectrum;
   a merit generator that:
   collects merit-related information specific to a location associated with the wireless network, a specified frequency band being chosen based on the merit-related information,
   transforms the merit-related information into different merit classes, each merit class associated with one or more frequency bands, and
   determines a quality measure associated with a frequency band by combining the different merit classes using a fusion method comprising at least one of Dynamic Classifier Selection (DSC), Classifier Structuring and Grouping (CSG) and Hierarchical Mixture of Experts (HME) methods, a higher quality measure indicating an unlicensed cognitive device operating in the frequency band generates less interference to the incumbent service than another frequency band associated with a lower quality measure; and
   a resource allocator that notifies a resource user device to operate in the specified frequency band.

2. The frequency resource allocation system of claim 1, wherein each merit class is associated with the one or more frequency bands to generate a merit based frequency band list that is stored in a frequency resource database.

3. The frequency resource allocation system of claim 1, wherein a merit value is associated with a merit class within an upper bound and a lower bound and wherein the merit value is represented by a soft value between the lower and upper bounds.

4. The frequency resource allocation system of claim 3, wherein at least one merit value is associated with a weighting factor.

5. The frequency resource allocation system of claim 4, wherein weighted merit values corresponding to the different merit classes are added together to yield a quality measure.

6. A frequency resource allocation method for a wireless network that comprises one or more unlicensed cognitive devices that operate using white spaces in a TV frequency spectrum and one or more licensed incumbent devices that are associated with an incumbent service that uses the TV frequency spectrum, comprising:
   storing one or more frequency resource databases that store one or more frequency band lists, wherein a frequency band list comprises one or more frequency bands within the TV frequency spectrum;
   collecting merit-related information specific to a location associated with the wireless network;
   transforming the merit-related information into different merit classes, each merit class associated with one or more frequency bands:
   determining a quality measure associated with a frequency band by combining the different merit classes using a fusion method comprising at least one of Dynamic Classifier Selection (DSC), Classifier Structuring and Grouping (CSG) and Hierarchical Mixture of Experts (HME), a higher quality measure indicating that an unlicensed cognitive device operating in the frequency band generates less interference to the incumbent service than another frequency band associated with a lower quality measure;
   choosing a specified frequency based on the merit-related information; and
   notifying a resource user device to operate in the specified frequency band.

7. The frequency resource allocation method of claim 6, wherein each merit class is associated with the one or more frequency bands to generate a merit based frequency band list that is stored in a frequency resource database.

8. The frequency resource allocation method of claim 6, further comprising associating a merit value with a merit class within an upper bound and a lower bound, wherein the merit value is represented by a soft value between the lower and upper bounds.

9. The frequency resource allocation method of claim 8, wherein merit value associated with a merit classes is associated with a weighting factor.

10. The frequency resource allocation method of claim 9, wherein merit values are associated with different merit classes based on corresponding weighting factors, and wherein the weighted merit values of the different the merit classes values are added together to yield a quality measure.

\* \* \* \* \*